Aug. 28, 1951  P. F. RAVILIOUS  2,565,628
DIFFERENTIAL SCREW ADJUSTMENT
Filed Oct. 29, 1946
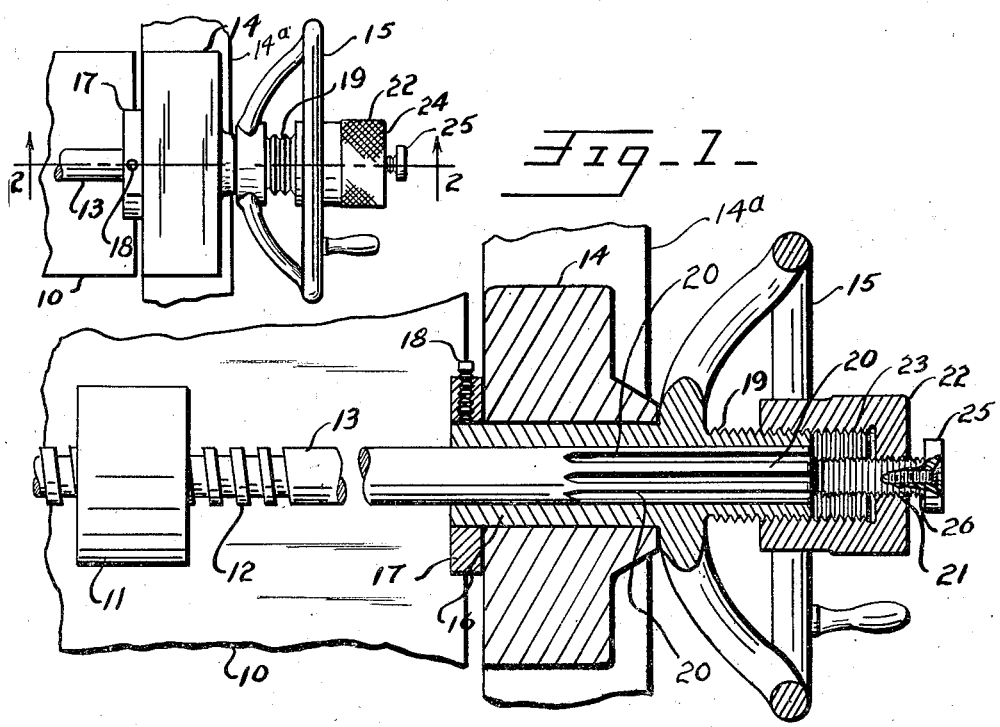
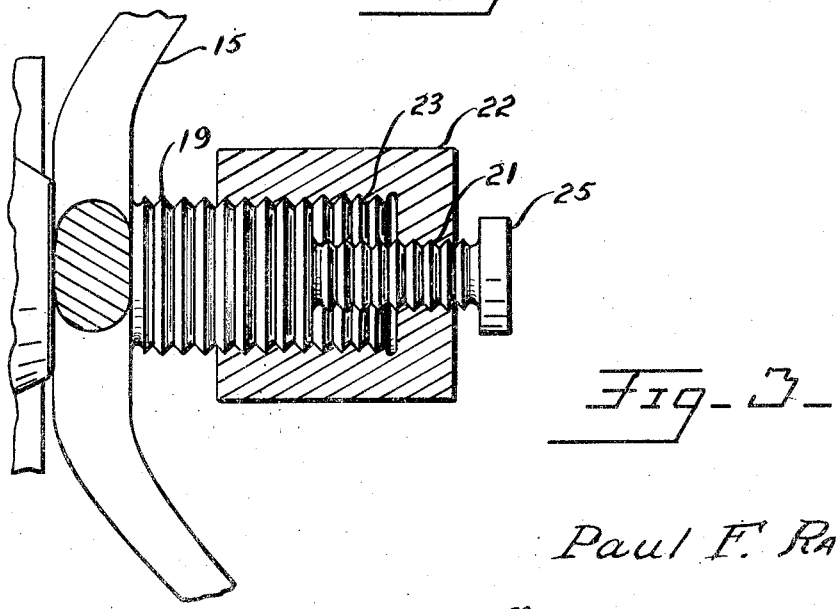
Inventor
Paul F. Ravilious Patented Aug. 28, 1951

2,565,628

UNITED STATES PATENT OFFICE 2,565,628

DIFFERENTIAL SCREW ADJUSTMENT

Paul F. Ravilious, Wilmington, Del.

Application October 29, 1946, Serial No. 706,292

4 Claims. (Cl. 74—424.8)

My invention relates to adjusting devices for working tables on machine tools and the like and more particularly to adjusting devices for fine adjustments.

The object of my invention is to provide an adjusting device adapted to impart to the working table or the like, which is to be adjusted relative to the tool, at will a fast preliminary adjustment or a slower, finer and more accurate adjustment.

Other objects of my invention may appear in the following specification describing my invention with reference to the accompanying drawings illustrating a preferred embodiment of my invention.

It is however to be understood, that my invention is not to be limited or restricted to the exact construction and combination of parts described in the specification and shown in the drawings, but that such changes and modifications can be made, which fall within the scope of the claims appended hereto.

In the drawing:

Figure 1 is an elevational top plan view of an adjusting apparatus according to my invention.

Figure 2 is a sectional view taken on line 2—2 in Figure 1, shown in a larger scale, and Figure 3 is an enlargement of the part of Figure 2 illustrating the mechanism for fine adjustments.

Referring now in detail to the drawing a working table 10 has an adjustment nut 11 either formed integrally therewith or rigidly mounted thereon.

A table adjustment screw 12, for coarse adjustment of the table, engages said table nut 11 and has an elongated smooth shank 13.

On the frame 14a of the machine tool a bearing block 14 is formed coaxially with the table nut 11.

A hand wheel 15 has a hollow hub 16 extending through and rotatably mounted in the bearing block 14. A stop ring 17 is mounted on the end of the hub 16 extending beyond the bearing block 14 and is secured on said end by means of a set screw 18. External threads 19 are formed on a portion of the handwheel hub extending outwardly therefrom.

The shank 13 of the table adjusting screw 12 fits slidably in the bore in the hand wheel hub 16, but is secured against rotary movement in the hub by means of splines 20.

Engaging the outer end of the coarse adjusting screw shank 13 is a fine adjusting screw 21 having threads finer than the coarse threads 12 and the threads 19. A knurled adjusting cap 22 has inner threads 23 engaging the hub threads 19, and an axial threaded hole in which the fine adjusting screw 21 is threaded to engage the outer end of the coarse adjustment screw shank 13. A head 25 is secured to the outer end of the fine adjusting screw 21 by a countersunk screw 26.

When the working table 10 is to be adjusted, the preliminary coarse adjustment is made by rotating the hand wheel 15, so as to rotate the coarse adjusting screw 12. When the final fine adjustment of the working table is to be made, the hand wheel is held with one hand, while the adjusting cap 22 is rotated with the other hand. The hub screw threads 19 may be nine threads to the inch, with the fine adjusting screw 21 ten threads to the inch, so that nine rotations of the adjusting cap 22 will result in a one inch axial travel of said cap on the hub threads 19, while the fine adjusting screw travels only 0.9 of an inch, thereby producing an axial sliding movement of the table adjusting screw 12 and of the table 10 of 0.1 of an inch.

It is to be understood that the ratio of the various screw threads can be changed to any desired ratio to obtain desired results.

The above described adjusting apparatus can be used and applied to jig-borers, milling machines and the like.

Having described my invention I claim as new and desire to secure by Letters Patent:

1. In an adjusting device, a relatively stationary nut, a relatively stationary bearing block formed with a smooth bore aligned with said nut, a hand wheel having a hub journalled in the bore of said bearing block, said hand wheel hub being formed with a smooth axial bore, a coarse adjustment screw threaded in said table nut and having a smooth shank slidable in the smooth bore of said hub, splines connecting said hand wheel hub and coarse adjustment screw shank for rotation together and sliding movement relative to said bearing block whereby rotation of said hand wheel in opposite directions produces coarse adjustment of said nut toward and away from said bearing block, said hand wheel hub having external axial screw threads finer than those of said coarse adjusting screw, a rotatable adjusting cap threaded on said hub screw threads having an element engageable with the adjacent end of the coarse adjustment screw shank whereby rotation of said cap in one direction produces finer adjustment of said nut away from said bearing block than is produced by corresponding rotation of said hand wheel.

2. In an adjusting device, a relatively stationary nut, a relatively stationary bearing block formed with a smooth bore aligned with said nut, a hand wheel having a hub journalled in the bore of said bearing block, said hand wheel hub being formed with a smooth axial bore, a coarse adjustment screw threaded in said table nut and having a smooth shank slidable in the smooth bore of said hub, splines connecting said hand wheel hub and coarse adjustment screw shank for rotation together and sliding movement relative to said bearing block whereby rotation of said hand wheel in opposite directions produces coarse adjustment of said nut toward and away from said bearing block, said hand wheel hub having external axial screw threads finer than those of said coarse adjusting screw, a rotatable adjusting cap threaded on said hub screw threads having an element engageable with the adjacent end of the coarse adjustment screw shank whereby rotation of said cap in one direction produces finer adjustment of said nut away from said bearing block than is produced by corresponding rotation of said hand wheel, said element comprising a fine adjustment screw threaded axially through said cap, said fine adjustment screw having finer threads than said finer adjustment cap whereby rotation of said fine adjustment screw relative to said cap in one direction produces finer adjustment of said work table away from said machine tool than produced by corresponding rotation of said adjusting cap.

3. In an adjusting device, a relatively stationary coarse nut, a relatively stationary bearing block formed with a smooth bore aligned with said nut, a hand wheel having a hub rotatable in said smooth bore, means acting between said hub and said bearing block precluding endwise displacement of said hub relative to said bearing block, said hub having a splined bore extending therethrough, a coarse adjustment screw threaded in said nut having a splined portion extending through the splined bore of said hand wheel hub and connecting said hub and said coarse adjustment screw for rotation together, said hub having an outer end remote from said coarse nut having external threads thereon finer than those of the coarse adjustment screw, an adjusting cap threaded on said outer end of the hub and having a closed outer end, and an element extending inwardly from the closed outer end of the cap and engaging the adjacent end of said coarse adjustment screw.

4. In an adjusting device, a relatively stationary coarse nut, a relatively stationary bearing block formed with a smooth bore aligned with said nut, a hand wheel having a hub rotatable in said smooth bore, means acting between said hub and said bearing block precluding endwise displacement of said hub relative to said bearing block, said hub having a splined bore extending therethrough, a coarse adjustment screw threaded in said nut having a splined portion extending through the splined bore of said handwheel hub and connecting said hub and said coarse adjustment screw for rotation together, said hub having an outer end remote from said coarse nut having external threads thereon finer than those of the coarse adjustment screw, an adjusting cap threaded on said outer end of the hub and having a closed outer end, and an element extending inwardly from the closed outer end of the cap and engaging the adjacent end of said coarse adjustment screw, said element comprising a fine adjustment screw having a thread finer than the thread on the outer end of said handwheel hub, and said closed outer end of said cap being formed with an axial threaded bore in which said fine adjustment screw is threaded.

PAUL F. RAVILIOUS.

REFERENCES CITED

The following references are of record in the file of this patent:

UNITED STATES PATENTS

| Number | Name | Date |
|---|---|---|
| 950,431 | Bradford | Feb. 22, 1910 |
| 1,300,047 | Thomas | Apr. 8, 1919 |
| 1,502,636 | Johnson et al. | July 22, 1924 |
| 2,338,271 | Ulanet | Jan. 4, 1944 |
| 2,342,830 | Bate | Feb. 29, 1944 |
| 2,370,882 | Serna | Mar. 6, 1945 |